United States Patent [19]

Gallagher et al.

[11] Patent Number: 4,880,131

[45] Date of Patent: Nov. 14, 1989

[54] RINGLESS PAINT CONTAINER

[75] Inventors: Thomas A. Gallagher, Chagrin Falls, Ohio; Paul Knowlton, Tinley Park; Leon Patarini, Palus Hills, both of Ill.

[73] Assignee: Van Dorn Company, Cleveland, Ohio

[21] Appl. No.: 120,471

[22] Filed: Nov. 13, 1987

[51] Int. Cl.[4] .............................................. B65D 43/00
[52] U.S. Cl. ...................................... 220/83; 220/355; 220/72; 220/74
[58] Field of Search ........................ 220/83, 74, 72, 355

[56] References Cited

U.S. PATENT DOCUMENTS

| | | | |
|---|---|---|---|
| 1,128,076 | 2/1915 | Taliaferro . | |
| 1,419,314 | 6/1922 | Sexton . | |
| 1,954,568 | 4/1934 | Kenny | 220/355 |
| 1,997,291 | 4/1935 | Barroll | 220/42 |
| 2,060,504 | 5/1935 | Kjellstrom | 220/42 |
| 3,056,525 | 10/1962 | Deinert | 220/21 |
| 3,142,433 | 7/1964 | Balocca | 229/51 |
| 3,170,590 | 2/1965 | Ullman et al. | 220/72 X |
| 3,333,723 | 8/1967 | Burdick, Jr. | 220/60 |
| 3,383,006 | 5/1968 | Knize | 220/42 |
| 3,613,938 | 10/1971 | Westcott | 220/44 |
| 3,721,365 | 3/1973 | Saunders | 220/47 |
| 3,732,909 | 5/1973 | Rooke et al. | 150/0.5 |
| 3,773,208 | 11/1973 | Curry | 220/43 |
| 3,804,289 | 4/1974 | Churan | 220/60 R |
| 3,809,284 | 5/1974 | Churan | 220/60 |
| 3,814,277 | 6/1974 | La Croce et al. | 220/42 C |
| 3,858,756 | 1/1975 | Fulton | 220/306 |
| 3,883,036 | 5/1975 | Mahaffy et al. | 220/306 |
| 3,944,115 | 3/1976 | Moonan et al. | 220/355 |
| 3,954,178 | 5/1976 | Mason, Jr. | 206/508 |
| 3,979,015 | 9/1976 | Arfert | 220/307 |
| 4,051,951 | 10/1977 | Smith | 206/508 |
| 4,054,229 | 10/1977 | Arfert | 220/288 |
| 4,079,857 | 3/1978 | Crisci | 220/306 |
| 4,083,468 | 4/1978 | Batchelor | 220/234 |
| 4,090,004 | 5/1978 | Tebbutt et al. | 428/64 |
| 4,141,463 | 2/1979 | Smith | 220/359 |
| 4,177,930 | 12/1979 | Crisci | 220/284 |
| 4,194,645 | 3/1980 | Zabner et al. | 220/306 |
| 4,220,254 | 9/1980 | Morton | 220/354 |
| 4,228,916 | 10/1980 | Weingardt | 220/354 |
| 4,256,240 | 3/1981 | Woinarski | 220/306 |
| 4,296,871 | 10/1981 | Andersson | 220/306 |
| 4,311,238 | 1/1982 | Smith | 206/508 |
| 4,334,631 | 6/1982 | Ballester | 220/306 |
| 4,344,546 | 8/1982 | Dry | 220/320 |
| 4,363,404 | 12/1982 | Westphal | 206/508 |
| 4,376,493 | 3/1983 | Gall | 220/307 |
| 4,380,304 | 4/1983 | Anderson | 220/306 |
| 4,386,715 | 6/1983 | Morton | 220/354 |
| 4,387,828 | 6/1983 | Yates, Jr. | 220/284 |
| 4,421,247 | 12/1983 | Lombardo et al. | 220/354 |
| 4,428,498 | 1/1984 | Obey | 220/367 |
| 4,429,805 | 2/1984 | Letica | 220/306 |
| 4,520,943 | 6/1985 | Nielsen | 220/281 |
| 4,632,272 | 12/1986 | Berenfield et al. | 220/324 |
| 4,676,392 | 6/1987 | Giggard et al. | 220/284 |
| 4,723,676 | 2/1988 | Kobayashi et al. | 215/301 |
| 4,723,681 | 2/1988 | Glerum | 220/72 |

*Primary Examiner*—Steven M. Pollard
*Attorney, Agent, or Firm*—Body, Vickers & Daniels

[57] ABSTRACT

An especially configured, ringless, container-lid design is disclosed having improved sealing characteristics applicable to paint containers for the consuming public. The rim portion of the container is provided with a tapered, especially shaped wall section terminating in a circular bead which is received in a sealing groove in the lid. The wal section flexes to maintain the seal established between the lid and the bead while sufficiently rigidized to prevent collapse of the container's sidewall. The design disclosed permits easy modification of the container for serially stacking thereof.

17 Claims, 3 Drawing Sheets

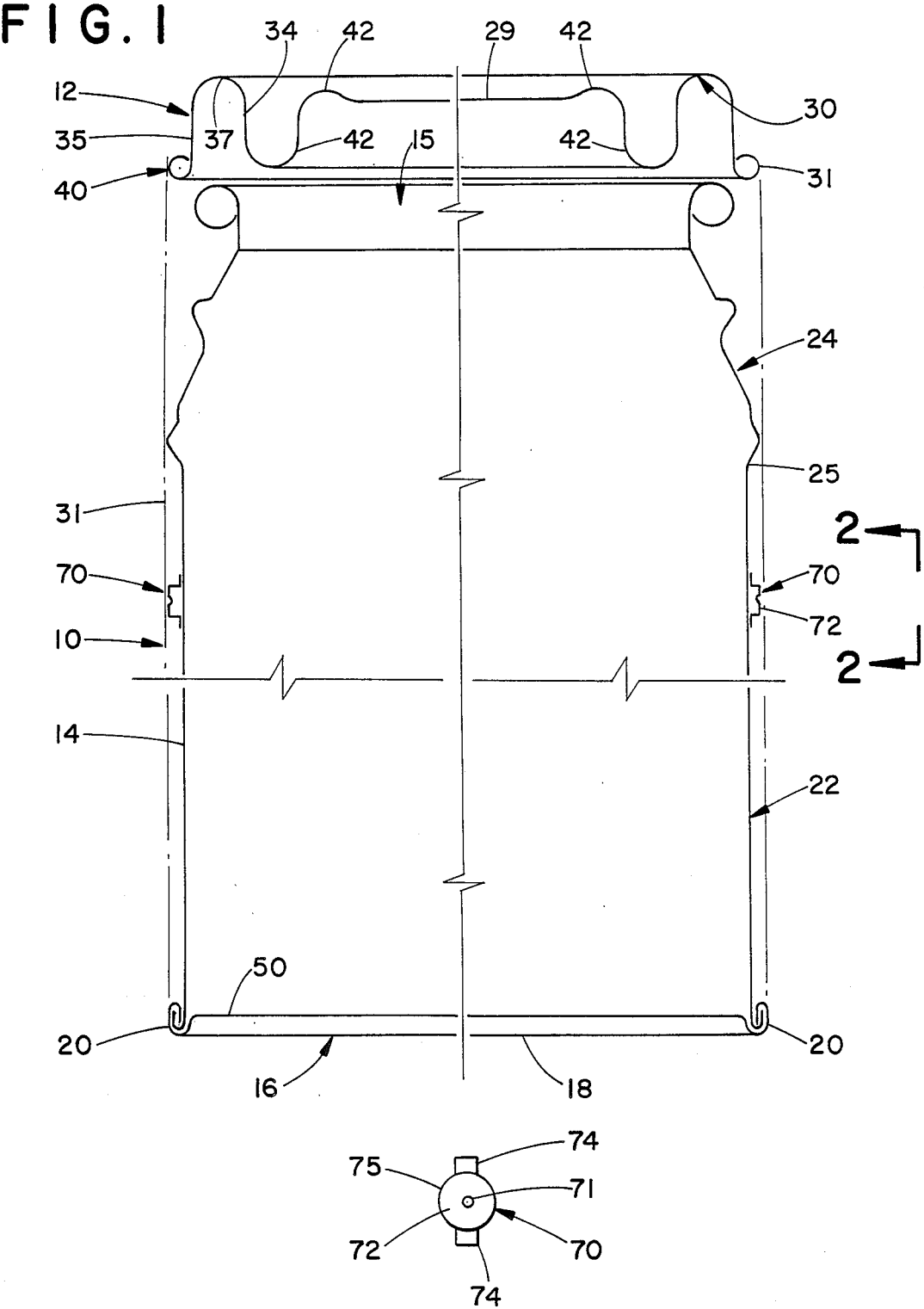

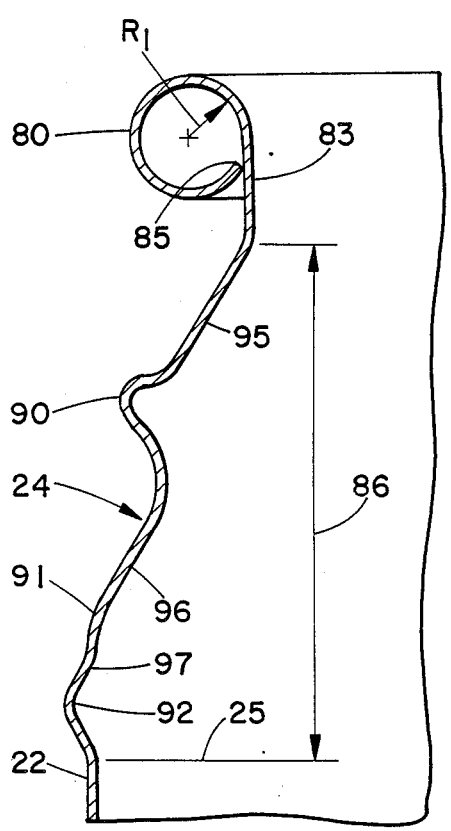
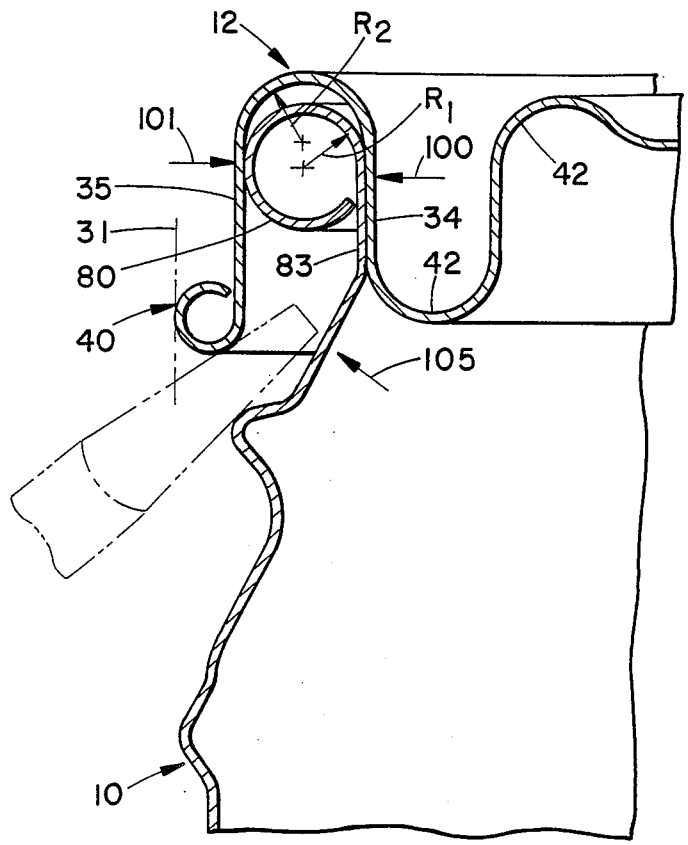
FIG. 3
FIG. 4
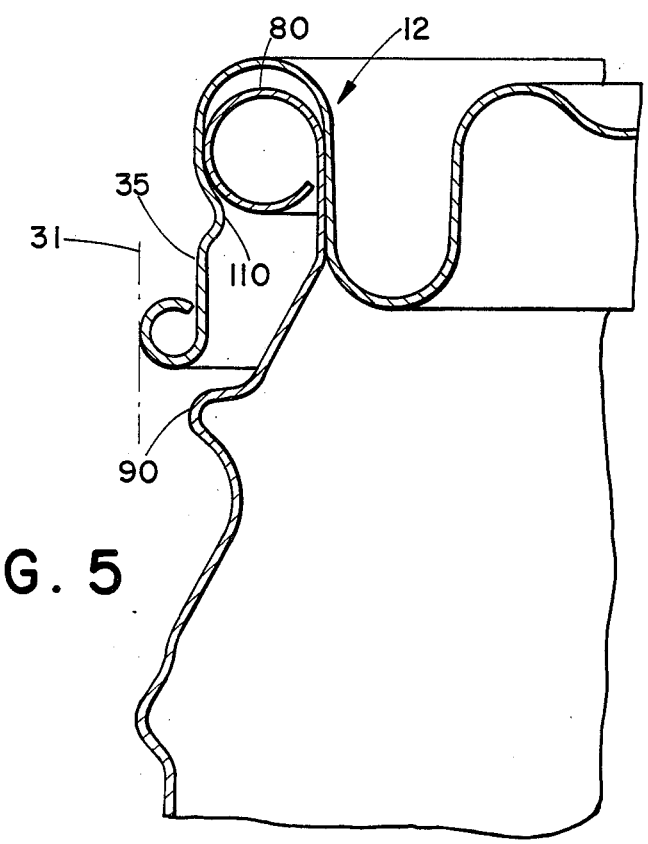
FIG. 5

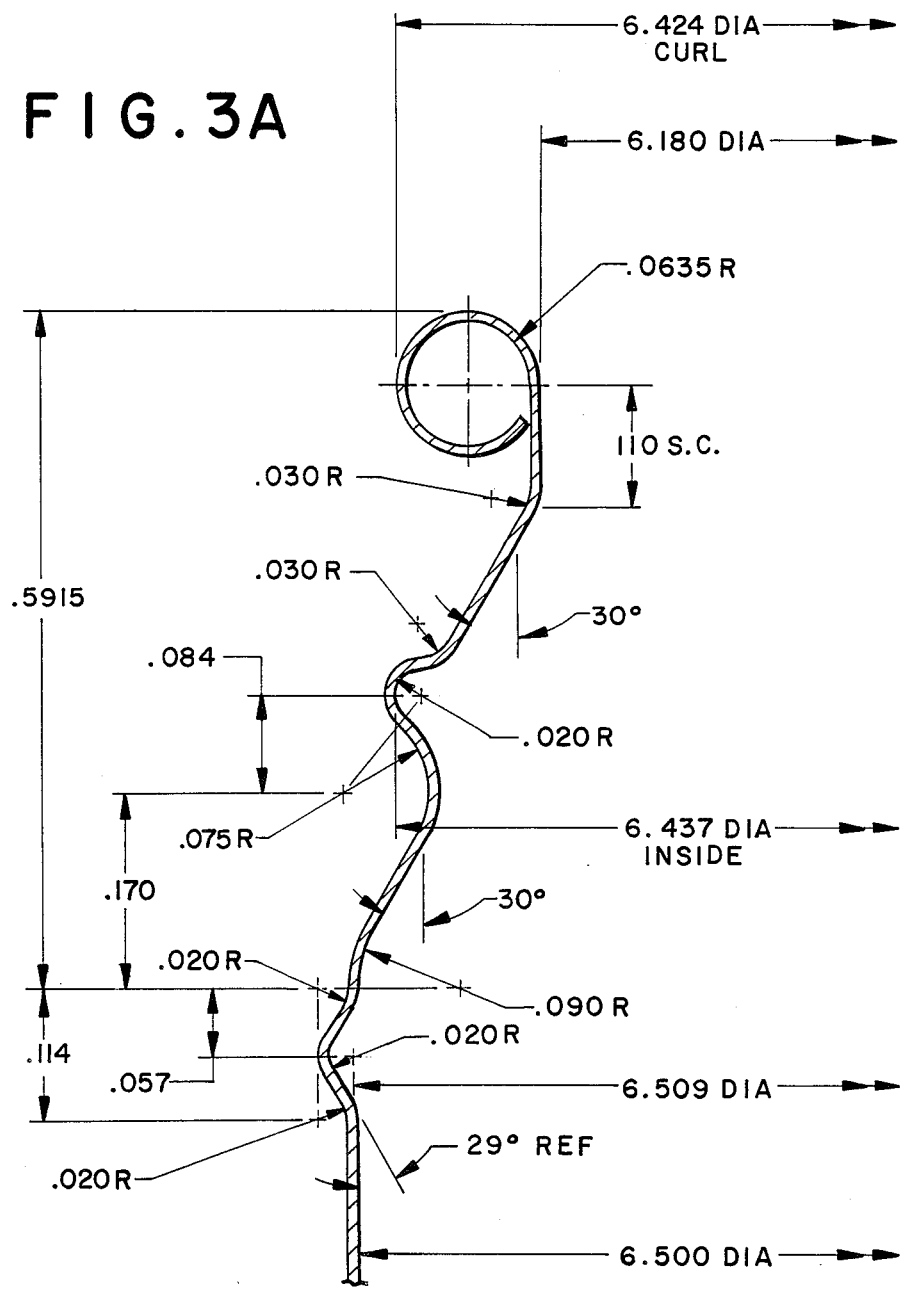

RINGLESS PAINT CONTAINER

This invention relates generally to metal containers with removable, resealable lids and more particularly to a ringless container in combination with a resealable lid.

The invention is particularly applicable to and suitable for use as a container for paints, varnishes, stains and the like sold to the consuming public and will be described with particular reference thereto. However, it will be appreciated to those skilled in the art that the invention has broader application and may be used as an air-tight container for any liquid or other substance which requires repeated on/off sealing applications of the container's lid.

BACKGROUND OF THE INVENTION

Conventional metal containers, particularly paint containers and the like for use by the consuming public which are cylindrical in shape, typically comprise a container body, a bottom plate closing one end of the container, a ring which is secured to the open end of the container and a lid or a plug which fits into the ring to close the container. Reference may be had to U.S. Pat. No. 4,421,247 to Lombardo et al for a typical example showing the plug and ring construction and the fit therebetween.

The cylindrical container body is usually formed from a rectangular flat piece of sheet metal rolled into a cylinder with the sides joined together by a continuous soldered side seam and a circular bottom plate is then attached, usually by a crimped double seam, to one of the open ends of the cylinder. At the other end of the cylinder, an annular, grooved ring member is similarly attached. Various types of seams can be used and some containers are simply drawn or stamped into a one piece container body although the seamed construction described is widely used. To complete the container description, bail lugs or trunnions are crimped into place on diametrically opposite positions on the container. Generally, the trunnions are cup shaped stampings with a peripheral flange formed on the rim of the cup. Typically, the sheet metal, prior to rolling into a cylinder, is stamped by a series of dies to form two indentations which will be diametrically opposite one another after the sheet metal is rolled into a cylinder. The bail lugs are then placed into the indentation and the indentation edges crimped over the bail lug's flanges to secure the lugs to the container body prior to rolling.

Paint containers of the type described have proven acceptable for their intended function and use. There are, however, a number of drawbacks which are principally centered about or arise because of the ring and plug construction described.

From the viewpoint of a can manufacturer, the ring is an unnecessary, appendage which, if removed, would materially simplify the container. That is the container could be manufactured with less metal. The container could also be manufactured quicker and more easily because making the ring and then seaming the ring to the container's sidewall opening would not be required. Thus, if the ring could be eliminated, the cost of the container would materially decrease.

From the consumer's viewpoint, the ring is undesirable because, despite several patented concepts to the contrary, the ring collects paint and prevents the container from being resealed in an air tight manner. The ring also inhibits the ability of the user to pour the contents of the container. The ring also prevents all the contents of the container from being emptied.

A less obvious drawback of the plug-ring design is that stacking or nesting of the containers, one on top of the other, can not occur with conventional designs. Stacking is important from both a shipping and dealer inventory standpoint. Such a feature is simply not readily available with conventional designs because the ring sealing grooves interfere with or prevent the formation of a plug or lid which can function as an interlocking member.

Within the container art, the ring is viewed as a necessary evil which is required to meet the stringent requirements of the paint industry so that, at least initially, an air-tight, shock resistant seal is achieved for the container body. Inherent in the ring-plug seal approach is the elimination of any problems which might otherwise result in attempting to seal, in a repeatable manner, a soldered seam. That is the container is rolled and maintained in a cylindrical shape by a longitudinal soldered seam which extends the entire length of the container. More precisely, each longitudinal end of the container is formed as a "U" and the ends are interlocked, crimped and soldered. The soldered seam is thus four times the thickness of the metal. By crimping the ring to the open end of the container and over the soldered seam permits the plug to be sealed within seamless groves formed in the ring. The ring-plug seal is taught in the container art as being effective because of the multiplicity of sealing surfaces. In practice, it is believed that the ring-plug closure initially operates as a seal because (i) there is no soldered seam to seal and (ii) an interference fit is established between the ring and the plug. That is, as the plug is wedged into the ring, various interference fits are formed by opposing wedge angles between the plug and ring which permanently deform the metal so that the lid is prevented from popping off when the container is dropped. Inherently, the effectiveness of the interference fit is diminished once the plug is removed from and then reapplied to the ring since the metal has already undergone a plastic deformation.

The prior art has long recognized the drawbacks attributed to plug-ring containers, and have developed numerous ringless designs principally to achieve a curled mouth opening in the container for enhanced pourability. U.S. Pat. Nos. 1,419,314 to Sexton and 2,060,504 to Kjellstrom are examples of early ringless paint container designs. Ringless non-paint container designs which are made from plastic, not sheet metal (to which the present invention relates) include U.S. Pat. Nos. 3,056,525 to Deinert and 3,732,909 to Rooke et al and are cited to simply show various locking closures, in plastic, which have certain sealing attributes. A paint container of a conventional sheet metal design which is not entirely dissimilar to that of the parent invention is shown in U.S. Pat. No. 3,333,728 to Burdick. Also, a hybrid design in the sense that a ring is employed with a curled opening is disclosed in U.S. Pat. No. 1,997,291 to Barroll. The Barroll concept, in various forms but always using a ring, is in use today on rectangular or oblong metal containers.

The ringless designs, despite the many claims and assertions made, are not suitable for today's paint containers. For one thing, today's paint containers are dimensionally standardized (within limits). Any newly designed can to be commercially successful must be compatible with existing manufacturing equipment and more importantly, with existing filling facilities. Secondly, the test standards for today's paint containers are stringent. Unique to paint container applications is the force developed within the container at various areas about the inside of the lid from the paint or fluid within the container which acts to pry the lid off when the paint container is dropped or when the container is impacted on its side such as when it enters a labelling machine or a shaker or is otherwise subjected to overall general abuse. In general, the uneven forces act to loosen the lid on the prior art ringless container design and break the air tight seal which was initially established when the lid was applied to the container. This principally results because there are only two annular seal areas in such designs and this results in an insufficient interference fit when contrasted to that fit established in the ring-plug closure. Additionally, when the lid must snap over a soldered bead which extends to the mouth of the container, the sealing of the container becomes especially difficult. Further, today's paint industry has developed other tests besides the shock test which prior art container designs were not subjected to at the time of their development and which, it is believed, would not be met by such containers today.

SUMMARY OF THE INVENTION

It is thus a principal object of the invention to provide a ringless container with a resealable lid which is suitable for use as a metal paint container.

This object along with other features of the invention is achieved by means of a cylindrical container in combination with a removable resealable lid. The lid comprises a generally flat base having a generally circular periphery and at least one annular sealing groove formed adjacent its peripheral edge. The lid's sealing groove is defined by longitudinally-extending inner and outer sealing walls with a bight wall therebetween thus forming an inverted U-shaped groove. The container has a generally cylindrical, longitudinally-extending side wall with a circular bottom wall at one end of the side wall and a generally circular open end at the opposite end of the side wall. More specifically, the container's side wall has a configured rim portion adjacent its open end and a generally cylindrical body portion extending from its bottom end to the rim portion. The rim sidewall portion is adapted to sealing receive the lid for closing the open end of the container and includes (i) the top end of the sidewall curled into a circular bead for sealingly engaging the sealing groove of the lid and (ii) a radially deflectable means adjacent the bead which permits resilient movement of the container sidewall to maintain the bead in sealing engagement with the lid's inner and outer seal walls should there be a shock imparted to the container.

In accordance with a more specific feature of the invention, the rim portion of the container's side wall has a longitudinally-extending sealing segment generally parallel to the body portion of the container's side wall and adjacent to and depending from the curled bead. The sealing segment is positioned radially inwardly from the body portion of the container and a transversely extending wall segment depends from the sealing segment to the body portion of the container. The radially inward sealing segment is adapted to be in contact substantially along its total length with the inner seal of the lid to define a rather large, longitudinally-extending, substantially air tight frictional sealing area between the lid and the container with the transversely extending frusto conical segment of the rim portion being somewhat flexible to assist in the maintenance of the seal in response to movement of the fluid within the container against the inner surface of the lid.

In accordance with another aspect of the invention, rigidizing means is provided in the rim portion of the container to resist longitudinal deflection of the curled circular bead when the lid is applied to the container or should the container be dropped on its lid. The rigidizing means includes at least a first pair of reverse bends formed in the transverse segment adjacent the body portion of the container's side wall which thus forms a first protrusion in the transverse segment and a second pair of reverse bends formed in the transverse segment which forms a second protrusion. The first protrusion also functions as a stop or guide means for locating the label applied to the body portion of the container. The second protrusion also provides a stop against which a bladed object can be inserted between the lid and the container to pry the lid off the container.

In accordance with another aspect of the invention, the flat portion of the lid or plug is flexible in response to the movement of the fluid to maintain, in cooperation with flexure of the body side wall portions of the container (which includes the rim portion) the aforedescribed seal surfaces in proper relation to one another.

Another feature of the invention resides in the overall dimensional relationship between the container and the lid. More specifically, the bead formed at the juncture of the bottom end of the container's cylindrical wall with the bottom wall of the container has a radial dimension or diameter equal to that of the first protrusion. The second protrusion has a lesser diameter and the outside diameter of the lid is not greater than the diameter of the bottom seam or the first protrusion. The result of sizing the container in accordance with such relationships assures that the container will roll in a straight line on its side so that paper and paper type labels can be applied to the container by rolling the container within the guides in conventional labelling machines.

Yet another feature of the invention resides in the formation of a slight recess in the bottom wall of the container which extends into the container's opening. This recess is sized to be slightly larger in diameter than that of the outermost annular wall of the U-shaped sealing grooved formed in the lid. The lid of the container is constructed such that the inverted U-shaped groove extends above the base portion of the lid. Thus, the containers can be nested, one on top of the other (with or without the lids attached), by a recess having a small depth which acts substantially over an area approximately equal to the diameter of the container to securely stack the containers in a positively interlocked manner.

In accordance with yet another aspect of the invention, the deleterious effects of the side wall seam on the seal between the lid and the rim portion of the container are minimized by resistance welding the longitudinal side wall ends to one another with an extremely small overlap therebetween thus minimizing any bulge in the rim portion of the container.

In accordance with yet another more specific feature of the invention, the cup shaped trunnions or bale lugs are formed with diametrically opposed tab portions extending from the cup's rim which are simply resistance welded to the container's side wall to avoid the multi-step die operations previously required to apply such lugs as described above. Importantly, the tabs are positioned parallel to the longitudinal centerline of the container to permit the container to be rolled into its cylindrical shape.

Yet another specific feature of the invention relates to the fact that the rim portion of the container is formed only by bending and rolling the container so that the sheet metal of the rim portion is not elongated or reduced in area such as that which might occur if the container were formed by a drawing operation thus insuring the desired resilient characteristics of the rim portion and dimensional accuracy thereof. Further to this feature of the invention the sheet metal gauge of the container is selected to assure the desired resiliency of the rim portion of the container. The overall diametrical relationship between the annular sealing groove formed in the lid and the circular curled sealing bead formed in the container's rim portion is such that at a "rest" or unassembled position, one has a slightly larger dimension than the other to assure sealing of the rim portion of the container when the lid is snapped in place thus affecting a seal at and adjacent the container side wall seam by the resiliency of the curved circular bead. Because there is not a significant plastic deformation of the metal when the lid is applied, the lid can be constantly reapplied to the container with the consistently good seals.

It is thus another object of the invention to provide a ringless container-lid design which realizes all the benefits accruing to such design while providing for a lid-container seal which is an improvement over the prior art.

Another object of the invention is to provide a container which meets all the dimensional requirements of standardized paint containers but is an improvement over conventional containers.

It is yet another object of the invention to provide a container-lid design which permits the containers to be stacked one on top of the other in a nested arrangement.

A still further object of the invention is to provide a metal ringless container which can be effectively sealed, in a repeatable manner, even though there is a seam in the open end of the container.

Yet another object of the invention is to provide a ringless container-lid design which is constructed to insure that the container rolls flat when placed on its side with or without the lid secured thereto.

Yet another object of the invention is to provide an improved container with a simplified arrangement for securing the wire handle thereto.

Still another object of the invention is to provide a new container-lid design which can utilize existing, conventional machinery to fill the container, seal the lid to the container and wrap the labels around the container's side wall.

These and other objects, features and advantages of the invention will become apparent from the following description of species thereof taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part thereof and wherein:

FIG. 1 is a sectional schematic illustration of the lid and the ringless container of the present invention;

FIG. 2 is a view of the bail trunnion taken along line 2—2 of FIG. 1;

FIG. 3 is an expanded view showing the cross section of the rim portion of the container of the present invention;

FIG. 3a is a view similar to FIG. 3 but showing the dimensional relationship for the rim portion of a 1 gallon cylindrical container of the present invention;

FIG. 4 is a view similar to FIG. 2 but showing the lid secured in place on the container; and FIG. 5 shows a modification to the preferred embodiment of the invention.

DETAILED DESCRIPTION OF THE PREFERRED EMBODIMENT

Referring now to the drawings where the showings are for the purpose of illustrating a preferred embodiment of the invention only and not for the purpose of limiting same (except with respect to the FIG. 3a embodiment), FIG. 1 shows a sectioned schematic illustration of a ringless container 10 and a lid 12 adapted to be secured to container 10. Container 10 and lid 12 are manufactured from tin coated sheet metal which is tempered at various temperatures and cycles to give desired physical properties. In the paint industry, the gauge of the metal is specified in pounds and containers are typically constructed from metal having gauges of 65 to 110 lbs. with heavier gauges used in larger containers and lighter gauges for smaller containers. For the one gallon container illustrated in the preferred embodiment the gauge is 85 lbs. This gauge exhibits good resiliency for the sealing characteristics of the present invention.

Container 10 includes a side wall 14 having an open end 15 and a closed end 16 defined by a bottom wall 18 secured by means of a conventional double seam 20 to closed end 16 of side wall 14. For purposes of explanation, side wall 14 may be further defined as comprising cylindrical body portion 22 and a frusto conical rim portion 24. Cylindrical body portion 22 begins at closed end 16 of side wall 14 and terminates at the beginning 25 of frusto conical rim portion 24 which in turn terminates at open end 15 of side wall 14.

Referring now to FIGS. 1 and 4, lid 12 is a generally circular plate pressed into the configuration of that illustrated by an appropriate die. More specifically, lid 12 has a generally flat base portion 29 and an annular sealing groove 30 formed adjacent to the peripheral edge 31 of lid 12. Sealing groove 30 is more particularly defined by a longitudinally-extending inner sealing wall 34 and a longitudinally-extending outer sealing wall 35 with a curved bight wall 37 connecting inner and outer sealing walls 34, 35. Bight wall 37 is formed with a predetermined radius of configuration designated as $R_2$ which will be explained in greater detail hereafter. It should be noted that inner sealing wall 34, bight wall 37 and outer sealing wall 35 form an inverted U-shaped groove. The peripheral edge 31 of lid 12 is curled to form a bead 40 which functions as a pry point for removing lid 12 from container 10. As shown, peripheral edge 51 of lid bead 40 is also in longitudinal alignment with the outer edge of bottom double seam 20 and, importantly, bead 40 is curled inwardly to permit container 10 with lid 12 applied to roll in a straight line for purposes of applying paper labels to filled containers 10 by means of conventional label machines. Adjacent sealing groove 30 is a rigidizing groove 42. Several rigidizing grooves 42 can be provided in lid 12 so that the generally flat base portion 29 of lid 12 is rigidized. Preferably, only one rigidizing groove 42 is provided to permit some flexibility in lid 12.

Referring further to FIG. 1, bottom wall 18 is recessed, typically ⅛", adjacent double seam 20 to define an annular seating wall 50 which importantly has a diameter approximately equal to the internal diameter of cylindrical body portion 22 of container 10. The dimensional sizing of the diameter of seating wall 50 and the diameter of outer sealing wall 35 of lid 12 is such that lid 12 closely fits into bottom plate 18 of a stacked container. The relatively large circumferential area of seating wall 50 provides a good retention area to maintain container 10 serially stacked, one on top of the other, than that which would otherwise necessarily occur if a smaller diameter seating wall were employed. A significantly smaller diameter seating area would occur, for example, if a conventional plug-ring container was modified to achieve a similar recess for stacking purposes.

Side wall 14 is rolled, not drawn, into the cylindrical and frusto conical configuration shown in FIG. 1 from a rectangular sheet metal plate. The longitudinally-extending ends of the flat plate are joined together into a longitudinal seam (not shown in the drawings) which extends from bottom wall 18 through open end 15 of container 10. In conventional can making processes, the longitudinally-extending ends of the rectangular plate are reversely crimped to form U-shaped longitudinally-extending ends which are then interlocked when the plate is formed into a cylinder, crimped and soldered. Thus a soldered seam has a thickness four times that of the container's side wall. In accordance with the present invention the longitudinal seam is resistance welded by simply overlapping the longitudinal ends of the rectangular place one on top of the other. Importantly, the overlap is closely controlled to a minimum value, not in excess of 0.4 mm. When the overlap edges are resistance welded, the thickness of the welded joint is controlled to be less than twice the thickness of the container's side wall's metal, preferably about one and a half times the thickness. Thus a longitudinal seam of only about 0.4 mm is formed and the longitudinal seam is only about one and a half times the metal thickness thus causing little disruption from a sealing consideration.

Two bale trunnions 70 are provided at diametrically opposite positions on the cylindrical body portion 22 of side wall 14 into which the ends of a wire handle (not shown) are inserted in a conventional manner for carrying container 10. The trunnions or bale lugs 70 (FIG. 2) are formed into a cup shaped configuration with an opening 71 in the base 72 for the ends of the wire handle and a pair of diametrically opposed tabs 74 is formed at the rim 75 of cup shaped trunnion 70. Tabs 74 are then resistance welded to side wall 14 of container 10 thus fixing trunnion 70 to side wall 14. Importantly, tabs 74 are positioned to extend in a longitudinal direction parallel to the longitudinal ends of the plate which is rolled into cylindrical side wall 14. Also, the widths of tabs 74 are controlled as well as the thickness to prevent interfering with the rolling operation of side wall 14. That is, if tabs 74 were not orientated as specified trunnions 70 would pull apart from side wall 14 or dent side wall 14 during the rolling operation. This does not occur in the prior art because of the looseness residing in the crimped joint formed in side wall 14 and trunnion 70. Side wall 14 may be slightly indented in the area where trunnions 70 are resistance welded thereto so that the cupped portion of trunnion 70 does not extend beyond the diameter of double seam 20. However, this is not necessary for labelling purposes since only the ends of container 10 are required to roll straight.

Frusto-conical rim portion 24 is disclosed in FIG. 3 and disclosed in FIG. 3a are the actual dimensions of a frusto-conical rim portion 24 for a 1 gallon cylindrical container 10 which has been successfully built and tested. It is believed that the dimensions would be similarly down sized for smaller containers such as pints or quart cans and uniformly increased for larger sized containers and that the relationships between the specified dimensions are necessary for the unique functioning of the container-lid seal. In any scaling up or down of the dimensions, it is contemplated that some variations of the dimensional relationship of up to about 10 percent (10%) is permitted. This is to compensate for changes in the sheet metal gauge for different sized containers and other factors.

Referring now to FIG. 3, open end 15 of side wall 14 is curled into a circular bead 80 of a predetermined radius $R_1$. Depending from circular bead 80 is a longitudinally-extending sealing segment 83 which is parallel to cylindrical body portion 22 and positioned radially inwardly therefrom a predetermined distance. Circular bead 80 is curled in the direction shown with its free end 85 positioned against the outside surface of sealing segment 83 to permit movement or flexure of circular bead 80 when annular sealing groove 30 is wedged into sealing engagement with circular bead 80 and sealing segment 83. A generally frusto conical, transverse segment 86 depends from sealing segment 83 and extends to the end of cylindrical body portion 22 the juncture therewith designated as line 25. Transverse segment 86 along with the flexing of cylindrical body portion 22 provides the radially deflectable means to permit the seal between circular bead 80 and sealing groove 30 to be maintained in the event of the container being subjected to shock loading. The flexibility of rim portion 24 is a function among other things of the angular relationship between transfer segment 86 and sealing segment 83 and cylindrical body portion 22. Good results have been achieved with an angular relationship of about 30° although various variations will be apparent to those skilled in the art. It should also be noted that this angle over the distance of transverse segment 86 is sized to permit the stacking concept defined above.

Significantly increasing the frusto-conical angle can result in a longitudinal downwardly deformation of rim portion 24 when lid 12 is applied over circular bead 80. To strengthen rim portion 24 against such longitudinal deformation three (3) upsets or protrusions 90, 91 and 92 are provided in transverse segment 86. It is believed that at least two such protrusions must be provided. In between protrusions 90, 91, 92 are frusto-conical portions 95, 96, 97, respectively, of transverse segment 86 and frusto-conical portions 95, 96, 97 are essentially parallel to one another to maintain the desired 30° flex relationship shown. First protrusion 90 does not extend a diametrical distance greater than that of the third protrusion 92 and functions as a pry point for a bladed tool to be inserted between rim portion 24 and bead 40 of lid 12 so that lid 12 can be removed from container 10. Third protrusion 92 also functions as a stop or a guide for the edge of the label applied to cylindrical body portion 22. Third protrusion 92 also has a diametrical distance approximately equal to that of double seam 20 to permit container 10 to be rolled in a straight line so that labels can be applied to cylindrical body portion 22 with conventional label applying machinery when lids 12 are not applied. Protrusions 90-92 rigidize transverse segment 86 against longitudinal deflection when a force is applied to lid 12 to fasten lid 12 to container 10 in a sealing manner.

FIG. 4 shows lid 12 applied to container 10. Preferably in an unassembled or "free" condition, radius $R_1$ of circular bead 80 is equal to or slightly greater than the distance $R_2$ which is the distance between inner sealing wall 34 and outer sealing wall 35 of sealing groove 30 of lid 12 so that an appropriate interference fit is formed. Also in an unassembled condition, the diameter of lid 12 from the center of bight wall 37 (i.e., center of radius $R_2$) is equal to or slightly smaller than the free standing diametrical distance from the center circular bead 80 (i.e., center of radius $R_1$). Preferably the diametrical differences are about 0.009". When lid 12 is applied over circular bead 80 free end 85 of circular bead 80 tends to move into a tighter curled position while transverse segment 86 of rim portion 24 is biased slightly outwardly. There is thus established a very tight interference fit between sealing segment 83 of rim portion 24 and inner sealing wall 34 along the entire length thereof and a small area contact (almost a line contact) between outer sealing wall 35 and circular bead 80. In this manner the adverse effects of sidewall seam 60 which extends about circular bead 80 to form an indentation therein which heretofore prevented air-tight sealing of ringless container lids is overcome or compensated by the resilient flexing of circular bead 80 as lid 12 is fastened thereto. A conventional sealant can be applied between the top of circular bead 80 and bight wall 37 of lid 12 should the container be filled with extremely liquid or watery substances such as stains and the like.

The prior art ringless paint container designs noted above provide some structural modification to rigidize the rim portion of the container against a lateral or radial direction. In U.S. Pat. Nos. 1,419,314 to Sexton and 2,060,504 to Kjellstrom the rim itself is bent over to form a U-shaped mouth with the legs extending a distance coupled with the bight wall sufficient to form a rigid mouth. In Burdick, the opening is curled in a bead as in the present invention. However, the container side wall, just below the curled opening is severely crimped or bent over onto itself to rigidize the mouth while also rigidizing the container side wall. In effect, the prior art ringless containers modified the rim portion of the container to rigidize the container's mouth and thus compensate for the rigidity of the ring which was eliminated in the design.

In contrast, the present invention's side wall and the rim portion is not rigidized. While the precise interaction between lid 12 and container 10 may not be fully understood, drop tests where the container has been dropped on its bottom wall 18 or on the edge of its bottom wall 18 have shown that the design disclosed provides better retention characteristics of lid 12 than that of conventional plug-ring devices or that certainly of prior art ringless design containers. Further, the improved sealing forces experienced in the drop tests continued to exhibit themselves until side wall 22 was physically damaged to the point where rim portion 24 became permanently distorted. This sealing characteristic is believed to only be attributed, secondarily, to a function of the interference fit between lid 12 and rim portion 24. In contrast the interference fit is believed to be of primary significance to the air-pressurized, lid popoff test and in the end analysis, is limited to a force which can be overcome easily by the user who must remove and reapply lid 12.

It is believed that when the container is subjected to such shock loading, the paint or liquid inside the container exerts an off center force about a discrete area on the inside of lid 12, the exact area determined by the position of the can on impact. This force is simultaneously transferred about a discrete portion of transverse segment 86. It is believed that the shock is thus dissipated in good part by the deflection of transverse segment 86 along with a deflection of cylindrical body portion 22 and a deflection of generally flat base portion 29 of lid 12 before its upward prying vector component is sufficient to release the seal established by the interference fit between annular sealing groove 30 with circular bead 80. More specifically, the interference fit established between lid 12 and circular bead 80 establishes a force 100 which is normal to inner sealing wall 34 and sealing segment 83 and force 101 over a line or small area contact between outer sealing wall 35 and circular bead 80. Normal forces 100 and 101 establish a frictional force which must be overcome to unseat lid 12. When container 10 is dropped on its edge, the force of the liquid illustrated generally by vector 105 is transmitted in part to transverse segment 86 which tends to flex or distort thus absorbing or dissipating some portion of liquid force 105 which would otherwise act to pry off lid 12. At the same time, the deflection of transverse segment 86 does not adversely act to unseat the interference fit forces 100 and 101 established between circular bead 80 and sealing groove 30. This is an entirely different action and reaction which occurs in the conventional interference fit established in a plug-ring structure. Prior art ringless designs do not utilize a flexible rim concept to maintain the seal. While the flexibility of the container design of the present invention can not be quantified, it is inherent in the design. Thus the gauge of the sheet metal could be increased as well as the interference fit between lid 12 and rim portion 24 and transverse segment 86 even straightened (thus preventing stacking and rolling of container 10) and the design disclosed will still have some flexibility in side wall 22 and lid 12 to enhance the sealing characteristics.

Also affecting the seal arrangement of the present invention is the longitudinally-extending side wall seam inherently present in the invention. As indicated above, if the container was attempted to be drawn into its present configuration without a longitudinal side seam, rim portion 24 could not accurately be drawn within its tolerance. Thus a longitudinally-extending side seam is required. If side seam is a conventional soldered side seam, its thickness, which would amount to 4 times the wall thickness, would adversely affect sealing of circular bead 80 and prevent rolling of the rim portion 24 into its desired configuration. Thus the side seam is resistance welded with a closely controlled overlapped on no more than about 0.04" to produce a seam when welded of approximately $1\frac{1}{2}$ times the wall thickness extending no more than 0.04 mm. Rim portion 24 is then rolled, in several steps, into its present configuration to maintain its thickness substantially throughout. Specifically, necking of rim portion 24 is avoided because of inability to hold dimensional tolerances and reduction of and a consequent weakening in the wall thickness. It is thus believed that by using a resistance welded longitudinally-extending side seam, closely controlled with a minimal overlap, and a rolled as opposed to a drawn or necked rim portion 24, an acceptable seal can be effected with no adverse consequences attributed to the resistance welded longitudinally-extending side seam.

An alternative embodiment is disclosed in FIG. 5 and like members will identify like parts where possible. The alternative embodiment includes forming a radially inwardly projecting groove or locking indentation 110 in outer annular wall 35 of lid 12. The remaining geometry of container 10 and lid 12 remains the same. As shown, locking indentation 110 engages circular bead 80 below the center of its arc $R_1$ to provide a snapping, positive seating engagement when lid 12 is sealed to container 10. In addition, the sealing area between outer annular wall 35 and circular bead 80 is increased. Thus a tighter seal is provided for in the alternative embodiment of FIG. 5 than that of the preferred embodiment. FIG. 5 is shown as an alternative embodiment because it requires an additional die or an additional rolling step to be performed in the manufacturing process which is not believed necessary for most applications. However, for certain thick wall containers, say 5 gallon containers and the like or where the adverse effects of the longitudinally welded side seam becomes significant, the FIG. 5 embodiment may be utilized.

Having thus described our invention it is apparent that many modifications and alterations may be made thereto without departing from the spirit or essence of the invention. For example, the invention has been disclosed and explained with reference to cylindrical metal containers where the invention has particular uniqueness and application. However, and in concept, a scaled down rim and lid could be applied to a cylindrical opening formed in an oblong or "F" shaped container having a rectangular top. Furthermore, the invention has been described with reference to paint containers where it has particular application. However, the container is, of course, suitable for other applications such as coffee cans, peanut cans and the like where the resealable characteristics of the container and the stacking feature assume significance. It is our intention to include all such modifications and alterations insofar as they fall within the scope of our invention.

It is thus the essence of our invention to provide a ringless container in combination with a removable, resealable lid which uses an especially configured rim opening to provide an effective lid-container seal.

Having thus defined the invention, the following is claimed:

1. A cylindrical metal container in combination with a removable, resealable lid comprising;
   (a) said lid having a generally circular configuration with an annular sealing groove formed adjacent its peripheral edge; said sealing groove defined by continuous longitudinally-extending inner and outer sealing walls with a bight wall therebetween thus forming an inverted, U-shaped groove;
   (b) said container having a generally cylindrical, longitudinally-extending side wall, a circular bottom wall at one end of said side wall and a generally circular top opening at the other end of said side wall, said container side wall further defined by a configured rim portion adjacent said top end and a generally constant diameter cylindrical body portion extending from said bottom wall to said rim portion;
   (c) said rim portion adapted to receive said lid for closing said top opening and further including (i) said top end of said side wall curled in a bead for sealing engaging said sealing walls of said lid, said outer sealing wall of said lid establishing approximately an annular line contact with said container's bead; (ii) a longitudinally-extending sealing wall segment generally parallel to said container's side wall and positioned radially inwardly therefrom adjacent to and depending from said curled bead and adapted to be in contact over a substantial portion of the length thereof with said lid's inner sealing wall to define a longitudinally-extending, frictional sealing area between said inner sealing wall of said lid and said sealing wall segment, and (iii) a frusto conical wall segment extending from said sealing segment to said container's side wall and having rigidizing means formed therein for principally resisting longitudinal deflection of said rim portion.

2. The container of claim 1 wherein said rigidizing means includes at least a first pair of reverse bends formed in said frusto conical wall segment adjacent said body portion of said sidewall to form a first relatively sharp protrusion in the shape of an annular groove extending radially outwardly and longitudinally aligned with said container's one end having a circular bottom wall and a second pair of reverse bends formed in a said transverse segment spaced from said first protrusion to form a relatively sharp second protrusion in the shape of an annular groove.

3. The container of claim 2 wherein said frusto conical container wall segment forms an acute angle with said side wall and is not significantly strengthened by said rigidizing means to resist radial deflection of said rim portion.

4. The container of claim 3 wherein said acute angle is about 30°.

5. The container of claim 2 wherein said outer sealing wall has a diameter less than that of said container's side wall and extends a vertical length which terminates adjacent said second protrusion and spaced radially outwardly therefrom; said second protrusion also providing a pry point for removing said lid from said container and said first protrusion defines a line for applying labels to the side of said container between said line and said bottom wall.

6. The container of claim 5 wherein said bottom wall is seamed to side wall to provide a juncture thereat which extends a predetermined distance radially outwardly from said body portion of said side wall, said first protrusion extending the same radially outward distance as said bottom wall seam and the outer peripheral edge of said lid extending a radially outward distance not greater than that of said first protrusion whereby said container rolls in a straight line when placed on its side.

7. The combination of claim 6 wherein said bottom wall of said container has an annular recess formed in a recessed U-shaped configuration slightly larger in diameter than said inverted U-shaped groove formed in said lid whereby said containers, with or without lids attached thereto, can be serially stacked on top of one another with all of said container's side walls in general longitudinal alignment with one another.

8. The combination of claim 7 further including a pair of cup shaped lugs having a tab extending from the base thereof and a circular central opening therein secured only by resistance welding said tabs on diametrically opposite portions on said body portion of said side wall whereby a bale can be fastened to said opening for lifting said container, said tab base extending radially outwardly from said side wall no further than said first protrusion.

9. The container of claim 1 or 5, wherein said container is formed from sheet metal in a rolling operation such that said sheet metal is not elongated in said rim portion and said side wall includes a longitudinally-extending continuous resistance welded side seam with an overlap of about 0.4 mm which when resistance welded does not increase the thickness of said welded overlap more than about one and one-half times the thickness of said side wall to minimize any adverse effects of sealing said rim portion of said container.

10. A cylindrical, metal container-lid combination having
- an open ended cylindrical body rolled from a flat sheet of metal having longitudinal ends resistance welded to form a longitudinal side seam;
- a bottom wall seamed to one end of said cylindrical body to close same, said bottom wall recessed to define a circular area having a first diameter defined by the inside wall of said seam;
- a curled circular bead formed at the other open end of said body;
- a circular lid for removably covering said open end, said lid having a generally flat circular base surface, and an inverted U-shaped annular groove extending away from said flat surface;
- said inverted U-shaped groove having an annular inner sealing wall, an annular outer sealing wall and a bight wall therebetween and adapted to engage said container's bead between said inner and outer wall when covering said open end; and
- said diameter of said outer annular wall of said lid slightly less than said first diameter for serially stacking said containers, one on top of the other, so that said bight wall rests in said recess in close proximity to said first diameter whereby a relatively large circumferential bearing area for serially stacking sealed containers is provided.

11. The container of claim 10 wherein said circular area is recessed approximately one-eighth of an inch.

12. The container of claim 10 further including a pair of trunnions resistance welded at diametrically opposite positions to said cylindrical body, each trunnion having a cup shaped body, said body having a closed end with an opening therein for the container's wire handle, and an open rim end, a pair of diametrically opposed tabs extending from said rim end and resistance welded to said cylindrical body, said tabs extending in said longitudinal direction of said plate forming said cylindrical side wall.

13. The container of claim 12, further including said outer wall of said lid terminating in a bead curled radially inwardly, the circumferential outer edge of said bead in longitudinal alignment with said bottom wall to insure rolling of said container in a straight line when placed on its side.

14. A metal container in combination with a removable, resealable lid comprising:
- said lid having a generally circular configuration with an annular sealing groove formed adjacent its peripheral edge; said sealing groove defined by continuous, longitudinally extending inner and outer side walls with a bight wall therebetween;
- said container having a body portion closed at one end and a rim portion extending from the opposite end of said body portion and terminating in a generally circular top opening, the intersection of said body portion with said rim portion defining a generally cylindrical surface from which said rim portion longitudinally extends;
- said rim portion having a generally frusto-conical wall segment of fixed length and transversely extending radially-inwardly a fixed distance, a longitudinally extending wall sealing segment extending from frusto-conical wall segment to said top opening of said container, said top opening curled in a bead at the end of said sealing segment, said bead extending radially outwardly from said sealing segment and having a diameter less than said radially inward distance of said frusto-conical wall segment;
- said sealing groove of said lid engaging said bead for closing said container, said outer sealing wall of said lid establishing approximately an annular line contact with said bead and said sealing wall segment of said rim portion establishing an annular area contact with said lid's inner side wall substantially along the entire length of said rim portion's sealing wall segment, whereby said lid is sealingly secured to said container; and
- rigidizing means formed in said frusto-conical segment of said rim portion principally for strengthening said frusto-conical wall segment against vertical deflection.

15. The container of claim 14 wherein said rigidizing means includes at least a first pair of reverse bends formed in said frusto-conical wall segment adjacent said body portion of said sidewall to form a first relatively sharp protrusion in the shape of an annular groove extending radially outwardly and a second pair of reverse bends formed in a said transverse segment spaced from said first protrusion to form a relatively sharp second protrusion in the shape of an annular groove extending radially outwardly therefrom.

16. The container of claim 14 wherein said outer sealing wall of said lid has an annular groove projecting radially inwardly formed therein; said groove formed a spaced longitudinal distance away from said bight portion which is at least greater than the radius of said bead in said container's rim portion so that said groove provides a second annular line contact with said container's bead whereby a positive, snapping action is provided when said lid is applied to said container.

17. The container of claims 1 or 2 wherein said outer sealing wall of said lid has an annular groove projecting radially inwardly formed therein; said groove formed a spaced longitudinal distance away from said bight portion which is at least greater than the radius of said bead in said container's rim portion so that said groove provides a second annular line contact with said container's bead, whereby a positive, snapping action is provided when said lid is applied to said container.

* * * * *